Sept. 13, 1960 C. W. McHENRY 2,952,282
HONEYCOMB SPLICE CLAMP
Filed Sept. 30, 1957

INVENTOR:
Charles W. McHenry,
By Herbert E. Metcalf
His Patent Attorney

United States Patent Office 2,952,282
Patented Sept. 13, 1960

2,952,282
HONEYCOMB SPLICE CLAMP

Charles W. McHenry, Palos Verdes, Calif., assignor to Northrop Corporation, Hawthorne, Calif., a corporation of California Filed Sept. 30, 1957, Ser. No. 687,067

1 Claim. (Cl. 144—297)

This invention has to do with tools and more particularly with a clamp that may in one application be applied to cellular material.

With the increasing use of honeycomb core material, an adequate method of splicing two or more sheets or sections together must be provided. It has been established that, in some circumstances, honeycomb material cannot be supplied in one continuous sheet. Certain conditions dictate that sheets of honeycomb material be spliced and bonded together. In order that the material be properly bonded, an adhesive of adequate tenacity must be provided, but as important, if not more so, is the fact that the two or more sheets of honeycomb material must be held in the proper relationship. This relationship, in general, includes the condition that the exposed surfaces must be as flat or parallel with relation to each other as is possible to obtain. In other words, the surfaces must not have shoulders on one side of the bonded area. Another relationship is that enough tension must be applied to the material pieces being bonded to provide an acceptable final product. At the same time this tension is not to be so great as to tear or shear the walls of the honeycomb core material. Additionally, the tension must extend from the upper surface of the sheet material to the lower surface. Uneven tension is not acceptable for the reason that an uneven bond could result.

An object of this invention is to provide a clamp for cellular material that has structure thereon that will engage sheets of material to hold the same in the proper position with the proper amount of tension equally distributed throughout that area of the material where the bond is to occur.

A yet further object of this invention is to provide a clamp for cellular material that will hold the material under proper tension but will not shear or weaken the walls of the material.

Another object of this invention is to provide a clamp for splicing or bonding cellular material that is readily inserted and removed from the material.

A yet further object of this invention is to provide a clamp, for bonding together sheets of cellular material, that is economical to use for the reason that it has an extended reusable life, is extremely economical to fabricate, is saving of the material to which it is applied, and is usable by the least skilled of labor.

Briefly, the invention comprises a flat plate in which is rigidly mounted a cellular material engaging projection or finger and in which is movably mounted a material engaging projection or finger.

Figure 1:
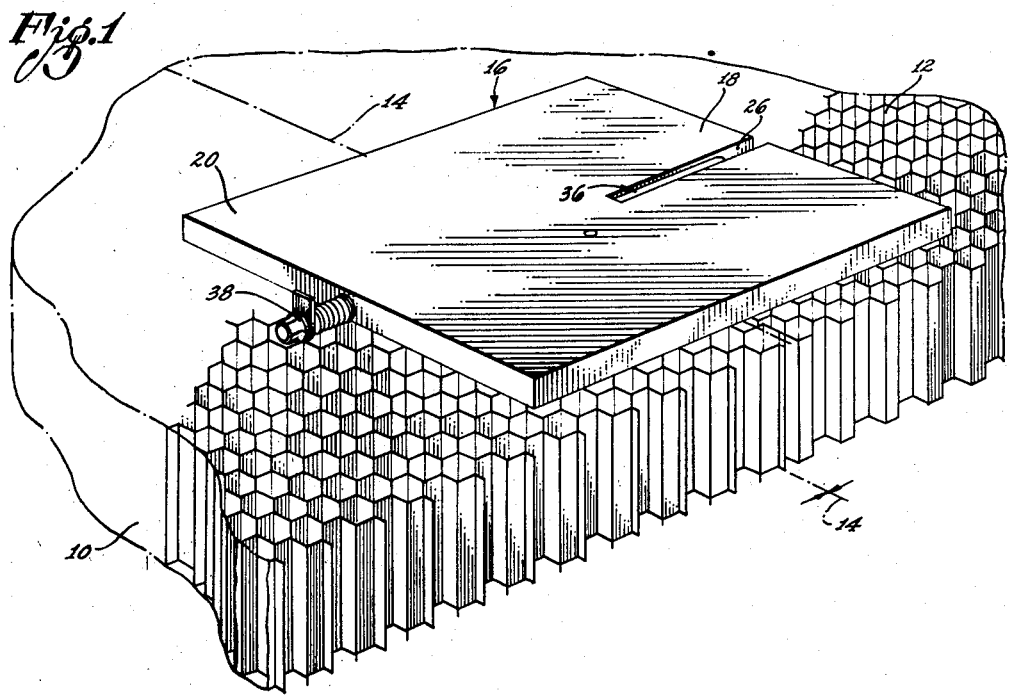
Figure 1 is a fragmentary, perspective view illustrating a pair of sheets of cellular material held under tension and in a bonding relationship by the present and one form of the invention.
Figure 2:
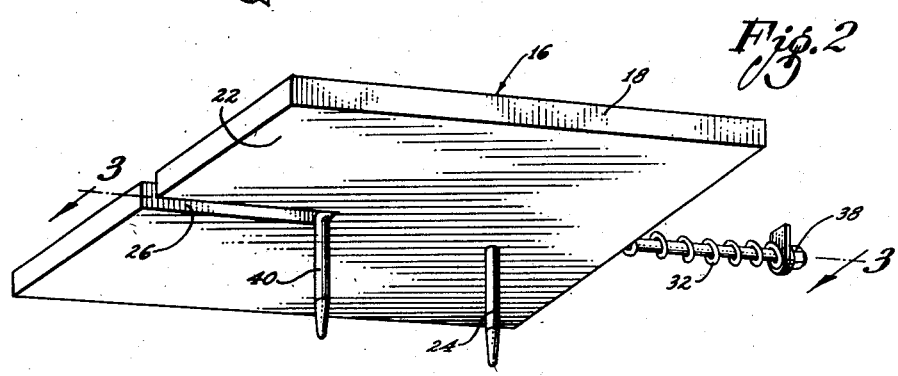
Figure 2 is a perspective view illustrating and having embodied therein the present invention.

Referring to the drawings for a more detailed description of the invention 10 and 12 designate a pair of honeycomb core material sheets held under tension for the purpose of bonding along the line or in the area 14.

The material is held by a clamp broadly designated 16. The clamp is made of a flat metal plate 18 which in the embodiment illustrated has a pair of parallel faces or sides 20 and 22. Face 22 is parallel with the upper surface of the material and is, for all intents and purposes, in continuous contacting relationship with the two illustrated sheets of material. The result of this continuous contacting relationship is that the surface of the material is continuous and uninterrupted. There are no shoulders to interrupt the continuity. This is very important.

The plate 18 has a tapered projection or material engaging finger 24 threaded therein. The exposed length of this finger is just slightly less than the thickness of the material.

An elongated slot 26 is formed in the plate 18 and in communication with the slot is an elongated opening or bore 28. That end of the bore or opening which is distant from the slot has a counter bore 30, the end wall of which defines a seat for a compression spring 32.

The long leg 34, of an L-shaped finger or projection 36, extends through the opening 28. The spring 32 slides over this long leg and is held in place by a handle assembly 38. The short leg 40 is tapered on the free end as is the finger 24. The leg 40 and finger 24 are substantially parallel and of equal length, but attention is directed to the fact that finger 24 is on one side or the other of the axis defined by the slot 26 and opening 28.

Figure 3:
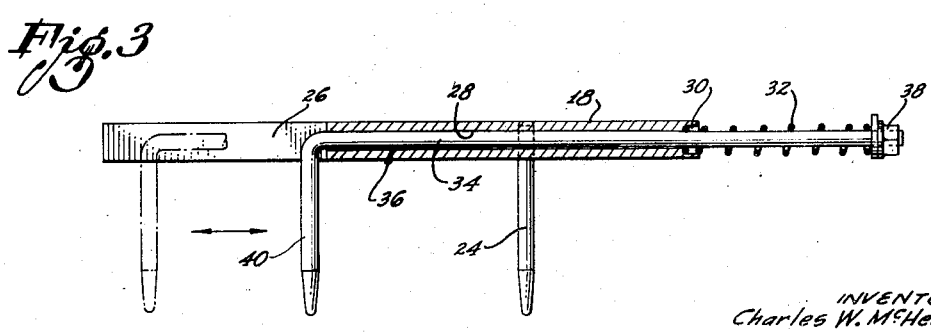
Figure 3 is a cross-sectional view taken on line 3—3 of Figure 2.

The operation of the device is as follows: The two sheets of cellular material 10 and 12 are brought into abutting relationship as illustrated in Figure 1. An adhesive may or may not be applied to the edges of the material. The L-shaped projection 36 is urged toward the dotted line position illustrated in Figure 3 which results in applying a spring tension or force thereto. In this position the clamp is dropped or placed in position on the two sheets of material with finger 24 being in an opening in one sheet of material and the short leg 40 being in a suitable opening in the opposed sheet of material. With the clamp in this position the handle assembly 38 is released and the tension of the spring is transferred to the two sheets of material 10 and 12. Attention is given to the condition of face 22 of the plate with respect to the surface of the material. As previously stated the face 22 is to be in substantially continuous contacting relationship. If an adhesive has been applied to the abutting edges of the two sheets of material 10 and 12 the same is now in condition to have further splicing or bonding steps applied.

The procedure for removing the clamp is the inverse of that for applying.

While in order to comply with the statute, the invention has been described in language more or less specific as to structural features, it is to be understood that the invention is not limited to the specific features shown, but that the means and construction herein disclosed comprise a preferred form of putting the invention into effect, and the invention is therefore claimed in any of its forms or modifications within the legitimate and valid scope of the appended claim.

What is claimed:

A clamp for honeycomb core comprising a flat plate, one face of which is in substantially complete contacting relationship with said core; said plate having an elongated slot therein and an elongated bore, parallel to the faces of the plate, therethrough in linear alignment and register with said slot; a pair of core engaging projections extending at right angles from one face of said plate, one of the projections being movable within said slot and having a right angularly extending leg slideably received in said bore and projecting outwardly from an edge of said plate, the other projection is threadably attached to said plate and in an offset position relative to said slot and opening; a handle on the outwardly projecting end of the leg; a spring seat on the handle; and a compressive spring about said projecting end of the leg between said handle and plate.

References Cited in the file of this patent

UNITED STATES PATENTS

| | | |
|---|---|---|
| 114,800 | Goodchild | May 16, 1871 |
| 1,197,063 | Robinson | Sept. 5, 1916 |
| 1,459,445 | Elderton et al | June 19, 1923 |
| 1,704,603 | Hartley | Mar. 5, 1929 |
| 2,319,377 | Wallace et al. | May 18, 1943 |
| 2,471,103 | Franks et al. | May 24, 1949 |
| 2,674,186 | Cameron | Apr. 6, 1954 |